(12) United States Patent
Patil et al.

(10) Patent No.: US 11,692,062 B2
(45) Date of Patent: Jul. 4, 2023

(54) METHODS OF MANUFACTURE FOR POLYETHERIMIDE

(71) Applicant: SABIC GLOBAL TECHNOLOGIES B.V., Bergen op Zoom (NL)

(72) Inventors: Dadasaheb V. Patil, Evansville, IN (US); Matthew L. Kuhlman, Evansville, IN (US); Peter Johnson, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 1037 days.

(21) Appl. No.: 16/469,336

(22) PCT Filed: Dec. 28, 2017

(86) PCT No.: PCT/US2017/068708
§ 371 (c)(1),
(2) Date: Jun. 13, 2019

(87) PCT Pub. No.: WO2018/126007
PCT Pub. Date: Jul. 5, 2018

(65) Prior Publication Data
US 2019/0309127 A1    Oct. 10, 2019

Related U.S. Application Data

(60) Provisional application No. 62/441,258, filed on Dec. 31, 2016.

(51) Int. Cl.
*C08G 65/40* (2006.01)
*C08G 73/10* (2006.01)
*C08L 79/08* (2006.01)

(52) U.S. Cl.
CPC ..... *C08G 65/4093* (2013.01); *C08G 65/4006* (2013.01); *C08G 73/10* (2013.01);
(Continued)

(58) Field of Classification Search
CPC .... C08G 73/107; C08G 73/1003; C08G 8/02; C07C 37/66; C07G 1/02; C07D 401/00
See application file for complete search history.

(56) References Cited

U.S. PATENT DOCUMENTS 3,847,867 A    11/1974 Heath et al.
5,162,492 A *  11/1992 Kaku ............... C08K 3/04
                                              528/229

(Continued)

FOREIGN PATENT DOCUMENTS

EP    0892003 A3    1/1999
EP    1660543 B1    4/2012

(Continued)

OTHER PUBLICATIONS

International Search Report for International Application No. PCT/US2017/068700, International Filing Date Dec. 28, 2017, dated Apr. 13, 2018, 5 pages.

(Continued)

*Primary Examiner* — Shane Fang
(74) *Attorney, Agent, or Firm* — Cantor Colburn LLP

(57) ABSTRACT

A method of making polyetherimide comprising reacting a first diamine having four bonds between the amine groups, a second diamine having greater than or equal to five bonds between the amine groups, 4-halophthalic anhydride and 3-halophthalic in the presence of a solvent and a polymer additive to produce a mixture comprising 3,3'-bis(halophthalimide)s, 3,4'-bis(halophthalimide)s, 4,4'-bis(halophthalimide)s, solvent and the polymer additive wherein the molar ratio of 3-halophthalic anhydride to 4-halophthalic anhydride is 98:02 to 50:50 and the molar ratio of the first diamine to the second diamine is 98:02 to 02:98; and reacting the mixture with an alkali metal salt of a dihydroxy aromatic compound to produce a polyetherimide having a cyclics content less than or equal to 5 weight percent, based (Continued)

on the total weight of the polyetherimide, wherein the polymer additive dissolves in the solvent at the imidization reaction temperature and pressure.

18 Claims, 2 Drawing Sheets

(52) U.S. Cl.
CPC ..... *C08G 73/1003* (2013.01); *C08G 73/1042* (2013.01); *C08G 73/1046* (2013.01); *C08G 73/1064* (2013.01); *C08G 73/1071* (2013.01); *C08L 79/08* (2013.01)

(56) References Cited

U.S. PATENT DOCUMENTS

| | | | |
|---|---|---|---|
| 6,906,168 | B2 | 6/2005 | Khouri et al. |
| 6,919,418 | B2 | 7/2005 | Khouri et al. |
| 8,907,042 | B2 | 12/2014 | Kuhlman et al. |
| 9,169,358 | B2 | 10/2015 | Kuhlman et al. |
| 2005/0049392 | A1* | 3/2005 | Khouri ............ C08J 3/095 528/499 |
| 2013/0108851 | A1 | 5/2013 | Kuhlman et al. |
| 2013/0108852 | A1 | 5/2013 | Kuhlman et al. |
| 2013/0303698 | A1 | 11/2013 | Chiong et al. |
| 2014/0094536 | A1 | 4/2014 | Guggenheim et al. |
| 2015/0073116 | A1 | 3/2015 | Kuhlman et al. |
| 2015/0079376 | A1 | 3/2015 | Kuhlman |
| 2015/0079377 | A1* | 3/2015 | Kuhlman ........ C08G 73/1003 528/170 |
| 2015/0080489 | A1 | 3/2015 | Kuhlman et al. |
| 2015/0337187 | A1 | 11/2015 | Kuhlman et al. |
| 2020/0024398 | A1 | 1/2020 | Patil et al. |
| 2020/0024400 | A1 | 1/2020 | Patil et al. |

FOREIGN PATENT DOCUMENTS

| | | |
|---|---|---|
| WO | 2005023903 A1 | 3/2005 |
| WO | 2013066757 A1 | 5/2013 |
| WO | 2015038858 A1 | 3/2015 |
| WO | 2015038859 A1 | 3/2015 |

OTHER PUBLICATIONS

International Search Report for International Application No. PCT/US2017/068704, International Filing Date Dec. 28, 2017, dated Apr. 24, 2018, 5 pages.
International Search Report for International Application No. PCT/US2017/068708, International Filing Date Dec. 28, 2017, dated Apr. 13, 2018, 5 pages.
Written Opinion for International Application No. PCT/US2017/068700, International Filing Date Dec. 28, 2017, dated Apr. 13, 2018, 6 pages.
Written Opinion for International Application No. PCT/US2017/068704, International Filing Date Dec. 28, 2017, dated Apr. 24, 2018, 10 pages.
Written Opinion for International Application No. PCT/US2017/068708, International Filing Date Dec. 28, 2017, dated Apr. 13, 2018, 8 pages.

* cited by examiner

METHODS OF MANUFACTURE FOR POLYETHERIMIDE

CROSS REFERENCE TO RELATED APPLICATIONS

This application is a National Stage application of PCT/US2017/068708, filed Dec. 28, 2017, which claims the benefit of U.S. Provisional Application No. 62/441,258, filed Dec. 31, 2016, both of which are incorporated by reference in their entirety herein.

BACKGROUND

Polyetherimides ("PEIs") are amorphous, transparent, high performance polymers having a glass transition temperature ("Tg") typically greater than 180° C. PEIs further have high strength, heat resistance, and broad chemical resistance, and are widely used in applications as diverse as automotive, telecommunication, aerospace, electrical/electronics, transportation, and healthcare.

However, the high viscosity of polyetherimide prevents its use in some applications requiring complex molds to be filled, especially molds with thin wall sections. Therefore, there is a need for a polyetherimide with sufficiently low viscosity to fill complex molds. The viscosity requirement is coupled with a need for ductility and thermal stability to allow manipulation of the molded article.

There accordingly remains a need in the art for methods for the manufacture of polyetherimides having improved properties, in particular polyetherimides having high Tg and improved flow at high shear, but with reduced levels of undesirable byproducts, including halogenated byproducts and low molecular weight cyclic byproducts. Such byproducts can have detrimental effect on the properties of resultant polymer. Such detrimental effects include lower glass transition temperature, reduced ductility, and reduced glossiness.

BRIEF DESCRIPTION

Disclosed herein is a method of making polyetherimide comprising: reacting a diamine having four bonds between the amine groups, a diamine having greater than or equal to five bonds between the amine groups, 4-halophthalic anhydride and 3-halophthalic anhydride at an imidization reaction temperature and pressure in the presence of a solvent and a polymer additive to produce a mixture comprising 3,3'-bis(halophthalimide)s, 3,4'-bis(halophthalimide)s, 4,4'-bis(halophthalimide)s, solvent and the polymer additive wherein the molar ratio of 3-halophthalic anhydride to 4-halophthalic anhydride is 98:02 to 50:50 and the molar ratio of the diamine having four bonds between the amine groups to the diamine having greater than or equal to five bonds between the amine groups is 98:02 to 02:98; reacting the mixture with an alkali metal salt of a dihydroxy aromatic compound to produce a polyetherimide having a cyclics content less than or equal to 5 weight percent, based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure. The produced polyetherimide has a viscosity that is at least 25% lower than the viscosity of a polyetherimide produced using a molar ratio of 3-halophthalic anhydride to 4-halophthalic anhydride of 05:95.

Also described is a method of making polyetherimide comprising: reacting an aromatic diamine having amine groups located on the aromatic ring in a meta relationship, an aromatic diamine having amine groups located on the aromatic ring in a para relationship, 4-halophthalic anhydride and 3-halophthalic anhydride at an imidization reaction temperature and pressure in the presence of a solvent and a polymer additive to produce a mixture comprising 3,3'-bis(halophthalimide), 3,4'-bis(halophthalimide), 4,4'-bis(halophthalimide), solvent and the polymer additive wherein the molar ratio of 3-halophthalic anhydride to 4-halophthalic anhydride is 98:02 to 50:50 and the molar ratio of the diamine having amine groups in a meta relationship to the diamine having amine groups in a para relationship is 98:02 to 02:98; reacting the mixture with alkali metal salt of a dihydroxy aromatic compound to produce a polyetherimide having a cyclics content less than or equal to 5 weight percent based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure. The produced polyetherimide has a viscosity that is at least 25% lower than the viscosity of a polyetherimide produced using a molar ratio of 3-halophthalic anhydride to 4-halophthalic anhydride of 05:95.

Also described is a method of making a polyetherimide comprising: reacting 4-halophthalic anhydride and 3-halophthalic anhydride with m-phenylenediamine and one or more of p-phenylenediamine and 4,4'-diaminodiphenyl sulfone at an imidization reaction temperature and pressure in the presence of a solvent and a polymer additive to produce a mixture comprising: 3,3'-bis(halophthalimide) having formula (I)

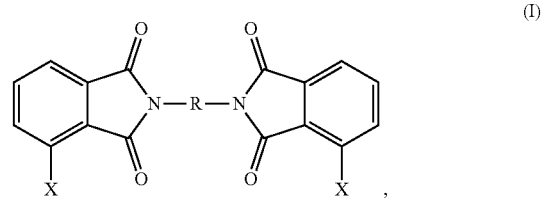

wherein R is m-phenylene; 3,3'-bis(halophthalimide) having formula (I)

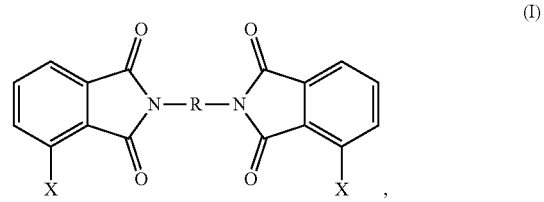

wherein R is p-phenylene, p-diphenylsulfone or a combination thereof; 3,4'-bis(halophthalimide) having formula (II)

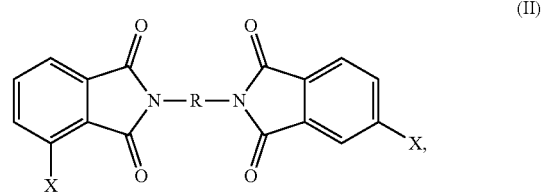

wherein R is m-phenylene; 3,4'-bis(halophthalimide) having formula (II)

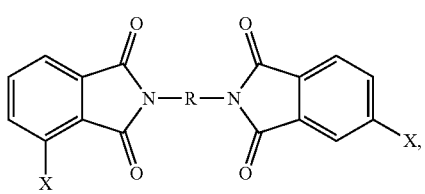

(II)

wherein R is p-phenylene, p-diphenylsulfone or a combination thereof; 4,4'-bis(halophthalimide) having formula (III)

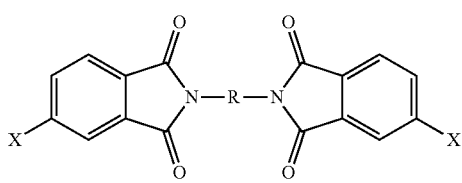

(III)

wherein R is m-phenylene; 4,4'-bis(halophthalimide) having formula (III)

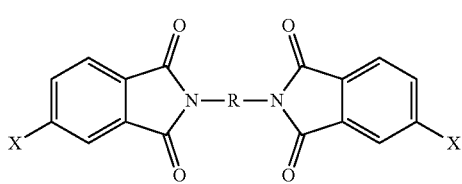

(III)

wherein R is p-phenylene, p-diphenylsulfone or a combination thereof, solvent, and polymer additive; and wherein the molar ratio of 3-halophthalic anhydride to 4-halophthalic anhydride is 98:02 to 50:50 and the molar ratio of the m-phenylenediamine to the one or more of p-phenylenediamine and 4,4'-diaminodiphenyl sulfone is 98:02 to 02:98; reacting the mixture with an alkali metal salt of a dihydroxy aromatic compound to produce a polyetherimide having a cyclics content less than or equal to 5 weight percent, based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure.

The above described and other features are exemplified by the following figures and detailed description.

DETAILED DESCRIPTION

Figure 1:
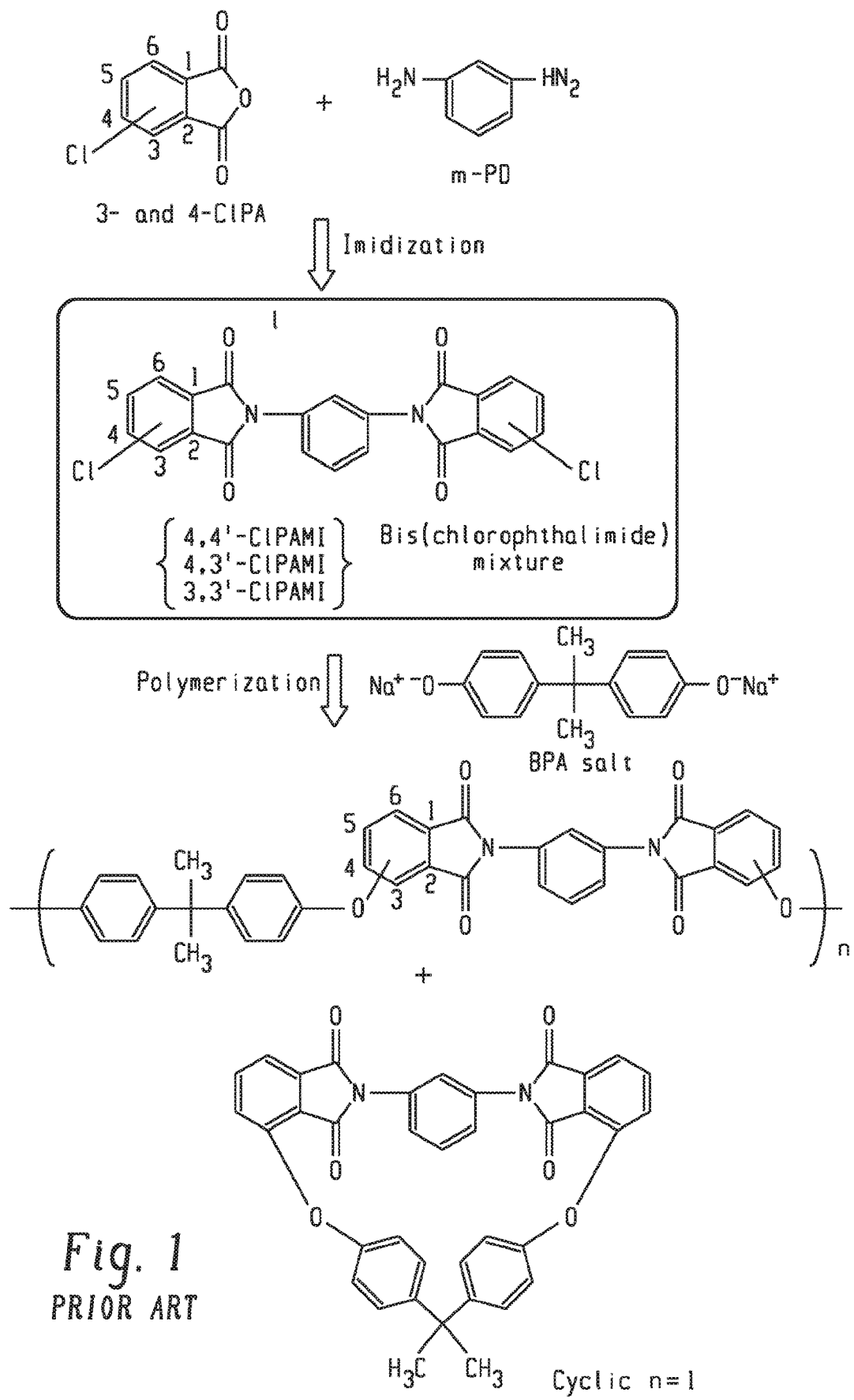
FIG. 1 shows a reaction scheme illustrating an ether-forming polymerization process for the manufacture of the polyetherimides.

Polyetherimides can be manufactured commercially by a "halo-displacement process". As shown in FIG. 1, a halo-gen-substituted anhydride is reacted with a diamine to form a bishalophthalimide. The bishalophthalimide is then reacted with a metal salt of a dihydroxy compound. Despite extensive investigation into the manufacture of polyetherimides produced using the halo-displacement process, there nonetheless remains a need for further improvement. For example, some polyetherimides are currently manufactured using a 95:5 ratio of the 4-isomer to the 3-isomer of the halophthalic anhydride, which yields a product having excellent ductility. Increasing the relative ratio the 3-isomer can enhance flow and glass transition temperature (Tg) of the polyetherimides, but above 50 mol %, the cyclic n=1 byproduct dramatically increases from non-detectable to 1.5 to 15% by weight. These high levels can be detrimental, because the low molecular weight cyclic byproduct can act as plasticizer, thereby reducing the Tg. The low molecular weight cyclic byproduct also can diffuse out of molded parts at aggressive molding conditions, causing splay and other issues. An exemplary cyclic n=1 is shown in FIG. 1.

Approaches to reducing the presence of the low molecular weight cyclic byproduct have included rigorous control of bis(halophthalimide) regioisomers used in the preparation of polyetherimides by the halogen displacement process. Control of the bis(halophthalimide) regioisomers has involved selective solubility as well as repetitive addition and stoichiometric monitoring of halophthalic anhydrides and bis(halophthalimide) regioisomers. In contrast, the method disclosed herein reliably produces a favorable distribution of regioisomers without repetitive stoichiometric monitoring and additions.

Polyetherimides comprise more than 1, for example 2 to 1000, or 5 to 500, or 10 to 100 structural units of formula (1)

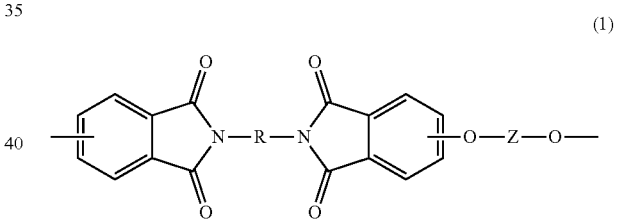

(1)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{4-20}$ cycloalkylene group. Suitable aromatic moieties include, but not limited to, monocyclic, polycyclic and fused aromatic compounds having 6 to 20, or, more specifically, 6 to 18 ring carbon atoms, and their substituted derivatives. Polycyclic aromatic moieties may be directly linked (such as, for example biphenyl) or may be separated by 1 or 2 atoms comprising linking moieties. Illustrative non-limiting examples of aromatic moieties include phenyl, biphenyl, naphthyl, phenanthryl, and their substituted derivatives. R is chosen so that there are R groups having 4 bonds between the nitrogen atoms and R groups having 5 or more bonds between the nitrogen atoms. The number of bonds between the nitrogens (and hence the number of bonds between the amino groups) is defined as the least number of consecutive bonds between the nitrogen atoms. The molar ratio of R groups having 4 bonds between nitrogens relative to R groups having greater than or equal to 5 bonds between the nitrogens is 98:02 to 02:98. In some embodiments, the molar ratio is 98:2 to 60:40 or 95:5 to 75:25, or 90:10 to 80:20. In some embodiments, the molar ratio is 90:10 to 10:90, or, 75:25 to 25:75, or, 65:35 to 35:65.

Further in formula (1), the divalent bonds of the —O—Z—O— group are in the 3,3',3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups of formula (2)

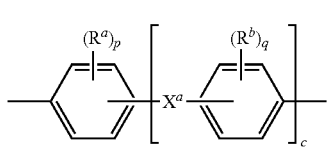

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, —P(R)(=O)— (wherein R is a $C_{1-8}$ alkyl or $C_{6-12}$ aryl), or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3)

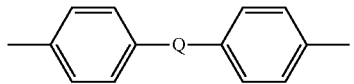

wherein Q is —O—, —S—, —C(O)—, —SO$_2$—, —SO—, —P(R)(=O)— (wherein R is a $C_{1-8}$ alkyl or $C_{6-12}$ aryl), or —C$_y$H$_{2y}$— wherein y is an integer from 1 to 5 or a halogenated derivative thereof (including a perfluoroalkylene group). In a specific embodiment Z is a derived from bisphenol A, such that Q in formula (3) is 2,2-isopropylidene.

In some embodiments in formula (1), R is m-phenylene, and at least one of p-phenylene and p-diphenylsulfone, and Z is a divalent group of formula (3). Alternatively, R is m-phenylene and at least one of p-phenylene and p-diphenylsulfone, Z is a divalent group of formula (3) and Q is 2,2-isopropylidene.

The polyetherimides can have a glass transition temperature of greater than or equal to 216° C., specifically of 216° C. to 240° C., as measured using differential calorimetry (DSC) per ASTM test D3418.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 25,000 to 150,000 grams/mole (Dalton), as measured by gel permeation chromatography, using polystyrene standards. In some embodiments, the polyetherimide has an Mw of 25,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

The polyetherimides are prepared by the ether-forming polymerization method. In this method, a halophthalic anhydride of formula (4)

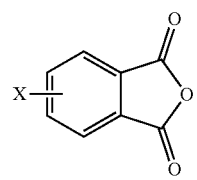

wherein X is a halogen, is condensed with an organic diamine of the formula (5)

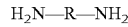

wherein R is as described in formula (1), to form a bis (halophthalimide) of formula (6).

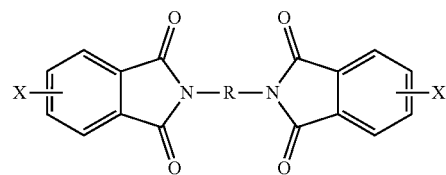

In an embodiment, X is a halogen, specifically fluoro, chloro, bromo, or iodo, more specifically chloro. A combination of different halogens can be used.

Illustrative examples of amine compounds of formula (5) having four bonds between amino groups include, propylenediamine, trimethylenediamine, 2,2-dimethylpropylenediamine, 1,3-cyclobutanediamine, 1,2-diaminocyclohexanediamine, 1,3-cyclohexanediamine, m-phenylenediamine, 2,4-diaminotoluene, 2,6-diaminotoluene, 2-methyl-4,6-diethyl-1,3-phenylene-diamine, 5-methyl-4,6-diethyl-1,3-phenylene-diamine, 1,8-diaminonaphthalene-1,3-diaminonaphthalene, 1,3-diamino-4-isopropylbenzene, 9H-fluorene-1,9-diamine, phenazine-1,3-diamine, 2,5-furandiamine, 2,4-diaminopyridine, 2,6-diaminopyridine, 4,6-diaminopyrimidine, and 2,5-thiophenediamine. Combinations of these amines can be used. Illustrative examples of amine compounds of formula (5) having five or more bonds between amino groups include 1,4-butanediamine, 1,5-pentanediamine, 1,6-hexanediamine, methylated and polymethylated derivatives of the foregoing, heptamethylenediamine, octamethylenediamine, nonamethylenediamine, decamethylenediamine, 1,11-diaminoundecane, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl)

amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, bis(aminocyclohexyl)isopropylidene, di(aminomethyl)cyclohexane, bis(aminomethyl)cyclohexanes, diaminobicycloheptane, diaminomethylbicycloheptane, diaminooxybicycloheptane, isophoronediamine, diaminotricyclodecane, 6,6'-bis(3-aminophenoxy)-3,3,3',3'-tetramethyl-1,1'-spirobiindane, 6,6'-bis(4-aminophenoxy)-3,3,3',3'-tetramethyl-1,1'-spirobiindane, diaminomethyltricyclodecane, siloxane diamines, such as 1,3-bis(3-aminopropyl)tetramethyldisiloxane, 1,3-bis(4-aminobutyl)tetramethyldisiloxane, α,ω-bis(3-aminopropyl)polydimethylsiloxane, and α,ω-bis(3-aminobutyl)polydimethylsiloxane, 3,3'-diamino-4,4'-diphenoxybenzophenone, 3,3'-diamino-4-biphenoxybenzophenone, 3,3'-diaminobenzophenone, 4,4'-diaminobenzophenone, 4,4'-bis(3-aminophenoxy)biphenyl, bis[4-(3-aminophenoxy)phenyl]ketone, 1,3-bis[4-(3-aminophenoxy)benzoyl]benzene, 4'-bis[4-(4-aminophenoxy)benzoyl]diphenylether, 1,3-bis(3-aminophenoxy)benzene, 1,4-bis(4-aminophenoxy)benzene, 2,2-di(4-aminophenyl)-1,1,1,3,3,3-hexafluoropropane, bis(aminomethyl)ether, bis(2-aminoethyl)ether, bis(3-aminopropyl)ether, p-phenylenediamine, m-xylylenediamine, p-xylylenediamine, benzidine, 3,3'-dimethylbenzidine, 3,3'-dimethoxybenzidine, 1,4-diaminonaphthalene, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Regioisomers of the above can also be employed. Combinations of these amines can be used.

In a specific embodiment diamine (5) is a combination of meta-phenylene diamine (7a) and one or more of para-phenylene diamine (7b), and 4,4'-diaminodiphenyl sulfone (7c).

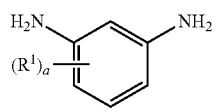
(7a)

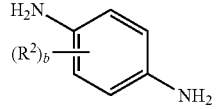
(7b)

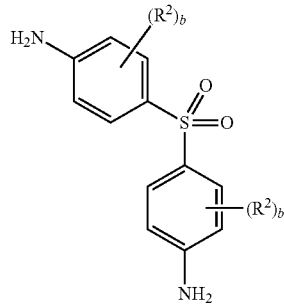
(7c)

wherein $R^1$ and $R^2$ are independently a halogen atom, nitro, cyano, $C_2$-$C_{20}$ aliphatic group, $C_2$-$C_{40}$ aromatic group, and a and b are independently 0 to 4. Specific examples of (7a) include meta-phenylenediamine (mPD), 2,4-diaminotoluene, 2,6-diaminotoluene, 2-methyl-4,6-diethyl-1,3-phenylenediamine, 5-methyl-4,6-diethyl-1,3-phenylenediamine, or 1,3-diamino-4-isopropylbenzene. Combinations comprising any of the foregoing amines can be used. Specific examples of (7b) include para-phenylenediamine (pPD), 2,3-dimethyl-1,4-phenylenediamine, 2,5-diamino-1,4-dimethylbenzene, 2,6-dimethyl-1,4-diaminobenzene, 2,5-diamino-1-(2-hydroxyethyl)benzene, 2,6-diethyl-1,4-benzenediamine, 2,3,5-trimethyl-1,4-benzenediamine, 2-methyl-1,4-benzenediamine, 2,3,5,6-tetramethyl-1,4-benzenediamine, 1,4-benzenediamine, 2-ethyl-6-methyl-. 2,6-diethyl-1,4-benzenediamine, 1,4-benzenediamine, 2-ethyl-6-(1-methylethyl)-1,4-benzenediamine, 2,6-bis(1-methylethyl)-1,4-benzenediamine. Specific example of (7c) include 4,4'-diaminodiphenyl sulfone (4,4'-DDS), 4,4'-sulfonylbis(2-methyl-) benzenamine, 4-[(4-aminophenyl)sulfonyl]-2-methyl-benzenamine, 4,4'-sulfonylbis[2-ethyl-benzenamine, 4,4'-sulfonylbis[2-ethyl-6-methyl-benzenamine, 4-[(4-aminophenyl)sulfonyl]-2-(trifluoromethyl)-benzenamine, 4,4'-sulfonylbis[2-(trifluoromethyl)-, 5-quinolinamine, 8-[(4-aminophenyl)sulfonyl]-benzenamine. Regioisomers of the above can also be employed. Combinations comprising any of the foregoing amines can be used.

Condensation of halophthalic anhydride (4) and amine (5) (imidization) is conducted in the presence of a solvent and a polymer additive. The polymer additive is chosen so as to dissolve in the solvent at a temperature less than or equal to the reaction temperature at the reaction pressure. "Dissolved" is defined as forming a solution which has no solids visible to the naked eye at a distance of 0.5 meters. The polymer additive is present in an amount of 1 to 10 weight percent with respect to the weight of bis(halophthalimide) produced during the imidization step. The polymer additive is added before, during, or after the imidization reaction, to produce a bis(halophthalimide) mixture. The polymer additive may have a weight average molecular weight of 25,000 to 110,000, or, more specifically, 25,000 to 65,000, or, 25,000 to 55,000.

Condensation of halophthalic anhydride (4) and amine (5) (imidization) can be conducted in the absence or presence of a catalyst. Exemplary catalysts for imidization include sodium phenyl phosphinate (SPP), acetic acid, hexaethylguanidinium chloride, benzoic acid, phthalic acid, or substituted derivatives thereof. In an embodiment, sodium phenyl phosphinate is used as the imidization catalyst. The catalyst, if used, is present in an amount effective to accelerate the reaction, for example 0.1 to 0.3 wt % based on the weight of diamine.

The reaction is generally conducted in the presence of a relatively non-polar solvent, preferably with a boiling point above about 100° C., specifically above 150° C., for example o-dichlorobenzene, dichlorotoluene, 1,2,4-trichlorobenzene, diphenyl sulfone, a monoalkoxybenzene such as anisole, veratrole, diphenylether, phenetole, sulfolane, dimethyl sulfone, dimethyl formamide, dimethyl acetamide, N-methylpyrrolidone, dimethyl sulfoxide, m-cresol, hexamethyl phosphoramide, dimethyl imidazole, or a combination thereof. Ortho-dichlorobenzene and anisole can be particularly mentioned.

The bis(halophthalimide)s (6) are generally prepared at a temperature greater than or equal to 110° C., specifically 150° to 275° C., more specifically 175° to 225° C. At temperatures below 110° C., reaction rates can be too slow for economical operation. Atmospheric or super-atmospheric pressures can be used, for example greater than 0 up to 7 atmospheres, or, greater than 0 to 3.5 atmospheres, or, greater than 0 to 1.75 atmospheres, to facilitate the use of high temperatures without causing solvent to be lost by evaporation.

The polymer additive may be used in an amount of 0.5 to 7.5 wt %, or, 2 to 7.5 wt %, or, 5 to 7.5 wt %, based on the weight of the polyetherimide produced in the polymerization. The polymer additive may be added as a liquid, pellet, blobs, grinds, suspension, powder, or a pre-devolatization solution.

The solvent, diamine (5), halophthalic anhydride (4), and polymer additive can be combined in amounts such that the total solids content during the reaction to form bis(halophthalimide) (6) is 20 to 55 wt %, or, 30 to 45 wt %, or 40 to 45 wt %. "Total solids content" expresses the proportion of the diamine, halophthalic anhydride, and polymer additive as a percentage of the total weight comprising of the diamine, halophthalic anhydride, polymer additive, and solvent.

A stoichiometric balance between halophthalic anhydride (4) and diamine (5) may be maintained to prevent undesirable by-products that can limit the molecular weight of the polymer, or result in polymers with amine end groups. Accordingly, in some embodiments, imidization proceeds by adding diamine (5) to a mixture of halophthalic anhydride (4) and solvent to form a reaction mixture having a targeted initial molar ratio of halophthalic anhydride to diamine; heating the reaction mixture to a temperature of at least 100° C. (optionally in the presence of an imidization catalyst); analyzing the molar ratio of the heated reaction mixture to determine the actual initial molar ratio of halophthalic anhydride (4) to diamine (5); and, if necessary, adding halophthalic anhydride (4) or diamine (5) to the analyzed reaction mixture to adjust the molar ratio of halophthalic anhydride (4) to diamine (5) to 1.98:1 to 2.2:1, preferably 2.0 to 2.1. While other ratios can be employed, a slight excess of anhydride or diamine can be desirable. Endcapping agents, such as mono-anhydrides or monoamines, or branching agents may also be employed in the reaction.

After imidization, the halogen group X of bis(halophthalimide) (6)

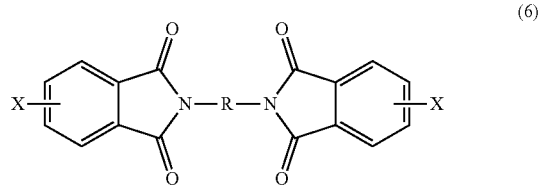

(6)

is displaced by reaction with an alkali metal salt of a dihydroxy aromatic compound of formula (9)

MO—Z—OM (9)

wherein M is an alkali metal and Z is as described in formula (1), to provide the polyetherimide of formula (1)

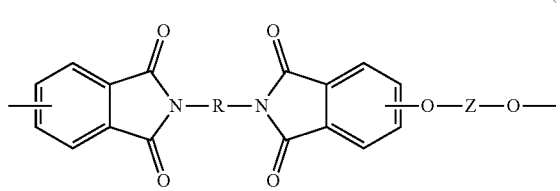

(1)

wherein R and Z are as defined above.

The alkali metal M can be any alkali metal, and is typically potassium or sodium. The alkali metal salt can be obtained by reaction of the metal with an aromatic $C_{6-24}$ monocyclic or polycyclic dihydroxy compound optionally substituted with 1 to 6 $C_{1-8}$ alkyl groups, 1 to 8 halogen atoms, or a combination thereof, for example a compound of formula (2), more specifically a dihydroxy compound corresponding to one of the groups of formulas (3), and still more specifically a bisphenol compound of formula (10):

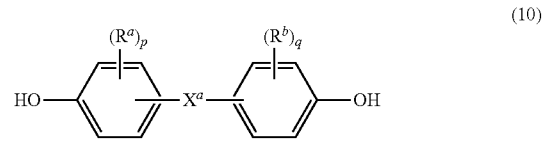

(10)

wherein $R^a$, $R^b$, and $X^a$ are as described in formula (2). For example, 2,2-bis(4-hydroxyphenyl) propane ("bisphenol A" or "BPA") can be used.

Polymerization by reaction of bis(halophthalimide) (6) with alkali metal salt (9) can be conducted in the presence or absence of phase transfer catalyst that is substantially stable under the reaction conditions used, in particular temperature. Exemplary phase transfer catalysts for polymerization include hexaalkylguanidinium and α,ω-bis(pentaalkylguanidinium)alkane salts. Both types of salts can be referred to herein as "guanidinium salts."

Polymerization is generally conducted in the presence of a relatively non-polar solvent, preferably with a boiling point above 100° C., specifically above 150° C., for example o-dichlorobenzene, dichlorotoluene, 1,2,4-trichlorobenzene, a monoalkoxybenzene such as anisole, veratrole, diphenylether, or phenetole. Ortho-dichlorobenzene and anisole can be particularly mentioned. Alternatively, a polar aprotic solvent can be used, illustrative examples of which include dimethylformamide (DMF), dimethylacetamide (DMAc), dimethylsulfoxide (DMSO), and N-methylpyrrolidinone (NMP), diphenyl sulfone, sulfolane, N-methyl-caprolactam, tetramethylurea, N-ethylpyrrolidone (NEP), 1,3-dimethyl-2-imidazolidinone (DMI). A combination comprising at least one of the foregoing solvents can be used. In some embodiments, the solvent used for polymerization is the same solvent that is used for imidization.

Polymerization can be conducted at a temperature of at least 110° C., specifically 150° to 275° C., more specifically 175 to 225° C. At temperatures below 110° C., reaction rates can be too slow for economical operation. Atmospheric or super-atmospheric pressures can be used, for example up to 7 atmospheres, to facilitate the use of high temperatures without causing solvent to be lost by evaporation.

In an embodiment, alkali metal salt (9) is added to the organic solvent and any water is removed from the mixture, for example as its azeotrope. The bis(halophthalimide) mixture is then added and water removed from the mixture, for example as its azeotrope, followed by addition of a catalyst in a pre-dried solution in organic solvent. Water removal from the system can be accomplished in either batch, semi-continuous or continuous processes using means known in the art such as a distillation column in conjunction with one or more reactors. In an embodiment, a mixture of water and non-polar organic liquid distilling from a reactor is sent to a distillation column where water is taken off overhead and solvent is recycled back into the reactor at a rate to maintain or increase the desired solids concentration.

Other methods for water removal include passing the condensed distillate through a drying bed for chemical or physical adsorption of water.

The molar ratio of the bis(halophthalimide) (6) to the alkali metal salt (9) can be 1.0:0.9 to 0.9:1.0. A solids content of the bis(halophthalimide) (6) in the polymerization can be 15 to 60 wt. %, based on the total weight of the polymerization mixture.

Thus, a method for the manufacture of the polyetherimides from the bis(halophthalimide) composition comprises combining, in the presence of a catalytically active amount of a phase transfer catalyst, the alkali metal salt (9) with a bis(halophthalimide) (6) mixture. In particular, the bis(halophthalimide)s (6) can be formed from the 3-halophthalic anhydride (4a) and/or the 4-halophthalic anhydride (4b)

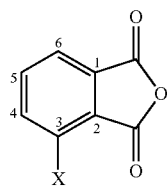

(4a)

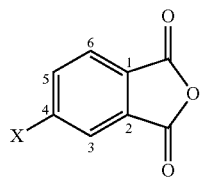

(4b)

to provide the 3,3'-bis(halophthalimide) (6a), the 3,4'-bis(halophthalimide) (6b), and/or the 4,4'-bis(halophthalimide) (6c).

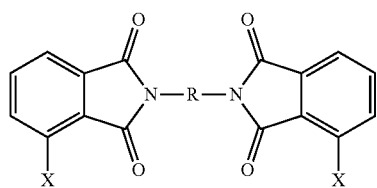

(6a)

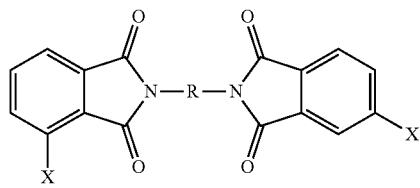

(6b)

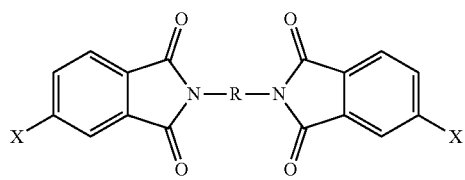

(6c)

As can be seen from formula (6b), when R is symmetrical (e.g., a 1,3-phenylene) the 3,4'- and 4,3' isomers are the same, but when R is not symmetrical (e.g., 1-methyl-2,3-phenylene) the 3,4' and 4,3' regioisomers are not the same. Reference to the 3,4' isomer herein and in the claims specifically includes the 4,3' isomer irrespective of whether R is symmetrical. In a specific embodiment, a combination of 3-chlorophthalic anhydride (3-ClPA), 4-chlorophthalic anhydride (4-ClPA) and a diamine (5) (e.g., meta-phenylene diamine as shown in the Figure) are reacted to produce the bis(chlorophthalimide) (ClPAMI) composition as a mixture of the 3,3'-bis(chlorophthalimide) (3,3-ClPAMI) (in FIG. 1, 1,3-bis[N-(3-chlorophthalimido)]benzene), the 3,4'-bis(chlorophthalimide) (3,4'-ClPAMI) (in FIG. 1, 1,3-bis[N-(3-chlorophthalimido, 4-chlorophthalimido)]benzene), and the 4,4'-bis(chlorophthalimide) (4,4'-ClPAMI) (in FIG. 1, 1,3-bis[N-(4-chlorophthalimido)]benzene).

Without being bound by theory, it is believed that the presence of the polymer additive helps to increase the amount of solid in the imidization reaction and the increased level of solids in the imidization reaction decreases the amount of cyclic (n=1) product produced during polymerization. Additionally, the presence of a minor amount of a bis(halophthalimide) having greater than or equal to 5 bonds between the nitrogen atoms helps to decrease the amount of cyclic (n=1) product produced during polymerization. This is despite a molar ratio of 3-halophthalic anhydride to 4-halophthalic anhydride of 95:05 to 60:40. Such an excess of 3-halophthalic anhydride would be expected to produce a much greater amount of n=1 cyclic byproduct.

The polyetherimides manufactured as described above may have a heat deflection temperature of at least 215° C., specifically at least 220° C., more specifically at least 225° C., when determined in accordance with ASTM 648 on a molded sample.

The polyetherimides manufactured as described above may have a viscosity that is at least 25%, or at least 30%, or at least 40% lower than the viscosity of a polyetherimide produced using a molar ratio of 3-halophthalic anhydride to 4-halophthalic anhydride of 05:95 when viscosity is determined using Parallel Plate Rheometry at 380° C.

The polymer additive may be any polymer that is stable at high temperatures and is compatible with the imidization conditions and subsequent phenoxide displacement polymerization conditions. In this context "compatible with" is defined as not hindering or preventing the imidization or phenoxide displacement. For example, the polymer additive can be a polyetherimide, a polyamideimide, a polyethersulfone, a polyaryl ether ketone, a liquid crystal polymer, a polyimide or a combination thereof. When the polymer additive comprises a polyetherimide the polymer additive can comprise the same repeating units as the polyetherimide produced by the method described herein or can comprise different repeating units from the polyetherimide produced by the method described herein. When the polymer additive comprises different repeating units from the polyetherimide produced by the method described herein the resulting composition is a blend of the two polyetherimides. If the blend of two polyetherimides are miscible and have a single glass transition temperature the single glass transition temperature is greater than or equal to 216° C. If the blend of two polyetherimides are immiscible and the blend has two glass transition temperatures then both of the glass transition temperatures are greater than or equal to 216° C.

The polyetherimides produced as described herein have reduced levels of the cyclic n=1 byproduct arising from the intramolecular reaction of the alkali metal salt (9) and the bis(halophthalimide) (6a). In an embodiment, the polyetherimide manufactured as described above comprises, based on the weight of the polyetherimide, less than or equal to 5 wt.

%, specifically less than or equal to 4 wt. %, more specifically less than or equal to 3 wt. % of the cyclic n=1 adduct of the alkali metal salt (9) and the bis(halophthalimide) (6a). In a specific embodiment wherein X is Cl, the polyetherimide comprises, based on parts of the polyetherimide, less than 5 wt. %, specifically less than 4 wt. %, more specifically less than 3 wt. % of the cyclic n=1 adduct of the alkali metal salt (9) and the bis(chlorophthalimide) (6a).

The compositions can further optionally comprise a reinforcing filler, for example a flat, plate-like, and/or fibrous filler. Exemplary reinforcing fillers of this type include glass flakes, mica, flaked silicon carbide, aluminum diboride, aluminum flakes, and steel flakes; wollastonite comprising surface-treated wollastonite; calcium carbonate comprising chalk, limestone, marble and synthetic, precipitated calcium carbonates, generally in the form of a ground particulates; talc, comprising fibrous, modular, needle shaped, and lamellar talc; kaolin, comprising hard, soft, calcined kaolin, and kaolin comprising various coatings known in the art to facilitate compatibility with the polymeric matrix resin; mica; and feldspar.

Exemplary reinforcing fillers also include fibrous fillers such as short inorganic fibers, natural mineral fibrous fillers, single crystal fibers, glass fibers, ceramic fibers, and organic reinforcing fibrous fillers. Short inorganic fibers include, borosilicate glass, carbon fibers, those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, comprising glass fibers such as E, ECR, S, and NE glasses and quartz, and the like can also be used.

In some applications, it can be desirable to treat the surface of the filler with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The polyetherimide compositions can include various additives ordinarily incorporated into polymer compositions of this type, with the proviso that any additive is selected so as to not significantly adversely affect the desired properties of the composition. Exemplary additives include antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame resistances, anti-drip agents, and radiation stabilizers. Combinations of additives can be used. The foregoing additives (except any fillers) are generally present in an amount from 0.005 to 20 wt. %, specifically 0.01 to 10 wt. %, based on the total weight of the composition.

In some instances, it is desired to have polyetherimide compositions that are essentially free of bromine and chlorine. "Essentially free" of bromine and chlorine means that the composition has less than 3 wt. % of bromine and chlorine, and in other embodiment's less than 1 wt. % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen per million parts by weight of the total composition (ppm). The amount of halogen can be determined by ordinary chemical analysis such as atomic absorption.

The polyetherimide compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polyetherimide polymers prior to melting. The melt processing is often done at 290 to 370° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The composition can then be molded in any equipment conventionally used for thermoplastic compositions, such as a Newbury or van Dorn type injection-molding machine with conventional cylinder temperatures, at 320° C. to 420° C., and conventional mold temperatures at 100° C. to 170° C.

The polyetherimide compositions can be formed into articles by any number of methods, for example, shaping, extruding (including profile extrusion), thermoforming, or molding, including injection molding, compression molding, gas assist molding, structural foam molding, and blow molding. In one embodiment a method of forming an article comprises shaping, extruding, blow molding, or injection molding the composition to form the article. Polyetherimide compositions can also formed into articles using thermoplastic processes such as film and sheet extrusion, for example melt casting, blown film extrusion and calendaring. Co-extrusion and lamination processes can be used to form composite multi-layer films or sheets.

Examples of applications include: food service, medical, lighting, lenses, sight glasses, windows, enclosures, safety shields, and the like. The high melt flow allows the composition to be molded into intricate parts with complex shapes and/or thin sections and long flow lengths. Examples of other articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers and the like, comprising devices that have molded in snap fit connectors. The polyetherimide compositions can also be made into film and sheet as well as compositions of laminate systems. Other articles include, for example, fibers, sheets, films, multilayer sheets, multilayer films, molded parts, extruded profiles, coated parts and foams: windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

The compositions are especially useful for articles such as reflectors, e.g., automobile reflectors, an optical lens, a fiber optic connector, and an adhesive.

Without further elaboration, it is believed that one skilled in the art can, using the description herein, utilize the present invention. The following examples are included to provide additional guidance to those skilled in the art of practicing the claims. Accordingly, these examples are not intended to limit the invention in any manner.

EXAMPLES

Materials used in the Examples are listed Table 1. Amounts listed in the Examples are in weight percent (wt. %), based on the total weight of the composition.

TABLE 1

| Material | Chemical Description | Source |
| --- | --- | --- |
| mPD | Meta-phenylenediamine | DuPont |
| pPD | Para-phenylenediamine | DuPont |
| 4,4'-DDS | 4,4'-diaminodiphenyl sulfone | Sigma-Aldrich |
| 4-ClPA | 4-chlorophthalic anhydride | SABIC |
| 3-ClPA | 3-chlorophthalic anhydride | SABIC |
| $Na_2BPA$ | Disodium bisphenol A | SABIC |
| oDCB | Ortho-dichlorobenzene | Fisher Scientific |
| HEGCl | Hexaethylguanidinium chloride | SABIC |
| $H_3PO_4$ | Phosphoric acid | Fisher Scientific |

Gel Permeation Chromatograph (GPC) Testing Procedure

The GPC samples were prepared by dissolving 5-10 milligrams (mg) of a sample in 10 mL of dichloromethane. Three to five drops of the polymer solution was added to a 10 milliliters (mL) dichloromethane solution with acetic acid (1-2 drops). The sample solution was then filtered and the analysis was performed by referencing the polymer peak to the oDCB peak. The instrument was a Waters 2695 separations module, which was calibrated with polystyrene standards from Aldrich chemical company. The cyclics [n=1] were analyzed by forcing a drop line on the baseline followed by integration.

Differential Scanning Calorimetry (DSC)

The DSC measurements on the polymer grinds obtained via Haake devolatilization were performed with a TA Q1000 DSC instrument. The glass transition temperature (Tg) was measured on a 10 mg polymer sample (solid) at a heating rate of 20° C./min. The sample was scanned from 40-300° C. under nitrogen atmosphere and the second heat temperature was reported.

Rheology Testing Procedure

The viscosity data was measured on polymer grinds using parallel plate rheometry, at 380° C. The frequency sweep comparison at lower frequency (1 rad/sec to 316 rad/sec) as well as the viscosity decrease (apparent viscosity decrease) over injection molding shear rates was determined. The ratio of viscosities at 1 rad/s to 100 rad/sec was measured at 380° C. This viscosity ratio gives a measure of shear thinning or improved flow properties. The higher the viscosity ratio, the higher is the shear thinning and hence improved flow.

The polymers prepared were targeted for 55,000 Mw, (polystyrene standards were used for calibration), but some were slightly higher and lower Mw. The polydispersity index (PDI) of the 3-ClPA enriched polymers were higher than the comparative example because of the cyclic [n=1] concentration. The cyclic [n=1] is an adduct of one BPA, and 3,3'-ClPAMI; and is characteristic of only the 3-ClPA enriched polymer systems due to the higher concentration of 3,3'-ClPAMI.

Imidization Step: A 1 liter (L), three-necked flask equipped with a stopper and a gas valve was charged with mPD, second diamine (pPD, 4,4'-DDS or both), 3-ClPA, 4-ClPA, HEGCl, 2.597 grams (g) of the polymer additive, and 225 g of oDCB. The amounts of mPD, second diamine, 3-ClPA and 4-ClPA were chosen to give the mol % shown in Table 2. The polymer additive was a polyetherimide having Mw of 45,000 to 48,000 Daltons. The flask was then equipped with a stir shaft and bearing, nitrogen adapter, and a Dean-Stark trap receiver topped with a reflux condenser. A gentle sweep of nitrogen was established through the headspace of the vessel. The reaction was then heated to 140° C. and then increased to 180° C. in one hour. The o-DCB was removed from the mixture until it reached 19-20 wt % solids (approximately 155 g of o-DCB was removed, removal took approximately 1.5 hours). The reaction of this mixture of ClPA generated a mixture of corresponding diamine based 3,3'-bis(chlorophthalimide), 3,4'-bis(chlorophthalimide) and 4,4'-bis(chlorophthalimide). A 30 mg sample was taken 3 hours after reaching 19-20 wt % solids and added to 20 mL acetonitrile. The sample was sonicated for 15 minutes, filtered (Titan 3/PTFE 0.45 μm), and then analyzed on the HPLC calibrated for monoamine. Monoamine is the mono-imide of halo-phthalic anhydride with a diamine, such as mPD. 3-ClPA, 4-ClPA, m-PD, and second diamine were also analyzed to determine the stoichiometric levels in the reaction. When the analyte levels were known, the appropriate correction was made for m-PD, second diamine, or 3-ClPA/ 4-ClPA. This process was repeated until the reaction had a 0.2 mole percent molar excess of ClPA with regard to total diamine. The reaction was then cooled and kept under an inert nitrogen atmosphere.

Polymerization step: Once the mixture of corresponding diamine based 3,3'-bis(chlorophthalimide), 3,4'-bis(chlorophthalimide), and 4,4'-bis(chlorophthalimide) isomers was made, the reaction vessel was then transferred to the dry box where 70 mol % of $Na_2BPA$ (o-DCB salt slurry, 12-20 wt % salt) and 3 mol % of NaPCP (the sodium salt of para cumyl phenol) were added. NaPCP was used as an end capper for the polymer. The mol % of BPA and PCP salts was based on the total moles of the bis(chlorophthalimide) generated in the Imidization step.

Figure 2:
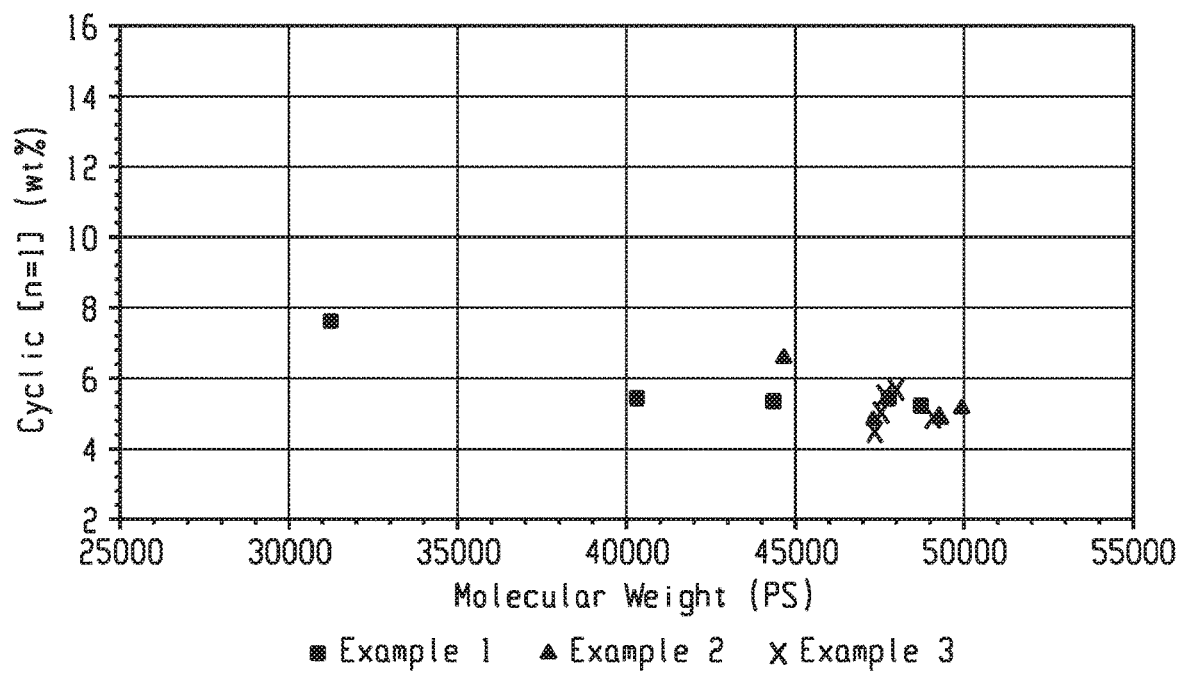
FIG. 2 is a graphical representation of data from the examples.

The reaction was then heated to 180° C. with a gentle nitrogen sweep, to remove some oDCB drying the mixture. oDCB was removed from the mixture until it reached 40-45 wt % solids. Once the overheads were dry by Karl Fischer, analysis (<50 ppm), 0.5 mol % of HEGCl (solids) was charged to the solution. Within 30 minutes, the solution became brownish and finally golden color after 90 minutes. Next, BPA corrections (20 mol %, 5 mol %, 2.5 mol %) were made. If the weight average molecular weight (MW) was below 30 kiloDaltons (KDa), further additions of $Na_2BPA$ were made until the desired MW of 37-50 KDa was reached. Molecular weight was monitored every hour until the reaction plateaued (defined as 3 samples within 500-700 Daltons). The reaction was then quenched at 160° C. with 0.879 g (1 mol % with regard to polymer) of concentrated $H_3PO_4$ (85% aqueous). Once the acid was added, a nitrogen purge was added for 5 minutes to remove any water, and the reaction was heated for another hour. The reaction was then cooled 140° C. and diluted to 10 wt % with oDCB. The mixture was then filtered on a Buchner funnel using a Whatman #1 (11 μm) sintered glass filter disk. The gold colored solution was then transferred to 1 L separatory funnel with an equal volume of acidic water and vigorously shaken. Once the contents of the funnel solution phase-separated, the golden polymer solution was transferred to a 1 L, three-necked flask and concentrated to 30-35 wt % solid solution, which was then devolatilized at 380° C. to obtain polymer sample, which upon grinding was used for analysis and testing. Results are shown in Table 2.

rheology) ratio) using methods described above. As can be seen a comparison of example 5 to examples 1-3 and 6 the cyclics concentration decreases with the presence of second diamine and a polymer additive. Using a polymer additive and second diamine, the cyclics concentration dropped from 15.75 wt % to <5 wt %. Also, a plot of cyclics concentration versus weight average molecular weight (Mw) revealed that the cyclic [n=1] levels drops as the reaction progress towards higher molecular weight (49,000-55,000) (see FIG. 2). The lowest cyclic [n=1] concentration of 3.73 wt % was achieved with 20 mol % pPD loadings and the cyclic content stayed relatively consistent across a range of diamine compositions. The PEI of examples 1-3 showed higher Tg than the comparative examples by at least 8-10° C. whereas the PEI of example 6 showed Tg similar to comparative example 4. The hydroxyl end group content ranged between

TABLE 2

|  | Ex. 1 | Ex. 2 | Ex. 3 | Ex. 4 (comparative) | Ex. 5 (comparative) | Ex. 6 |
| --- | --- | --- | --- | --- | --- | --- |
| ClPA Isomer (mol %) | | | | | | |
| 3-ClPA | 98 | 98 | 98 | 5 | 98 | 98 |
| 4-ClPA | 2 | 2 | 2 | 95 | 2 | 2 |
| Diamine (mol %) | | | | | | |
| mPD | 90 | 85 | 80 | 100 | 100 | 80 |
| pPD | 10 | 15 | 20 | 0 | 0 | 0 |
| 4,4'-DDS | 0 | 0 | 0 | 0 | 0 | 20 |
| Properties | | | | | | |
| Mw (Da) | 46509 | 49888 | 45242 | 55000 | 51902 | 37201 |
| Mn (Da) | 13945 | 15480 | 14459 | 24000 | 16955 | 16,316 |
| Polydispersity Index (PDI) | 3.38 | 2.16 | 2.81 | 2.40 | 3.06 | 2.28 |
| Cyclics (n = 1) wt % | 4.73 | 4.94 | 5.15 | 0.1 | 15.75 | 3.73 |
| Tg (° C.) | 229 | 230 | 227 | 219 | 232 | 216 |
| OH end group (ppm) | 276 | 263 | 211 | — | — | — |
| Rheology ratio | 3.34 | 2.37 | 3.37 | 2.08 | 3 | — |
| Viscosity (pa) measured at rad/sec | | | | | | |
| 1 | 713 | 2221 | 1371 | 7000 | — | — |
| 2 | 589 | 1859 | 1057 | 6813 | — | — |
| 3 | 464 | 1611 | 830 | 6709 | — | — |
| 6 | 375 | 1445 | 680 | 6604 | — | — |
| 10 | 312 | 1336 | 580 | 6452 | — | — |
| 18 | 270 | 1248 | 514 | 6213 | — | — |
| 32 | 243 | 1155 | 469 | 5878 | — | — |
| 56 | 223 | 1051 | 437 | 5416 | — | — |
| 100 | 211 | 933 | 410 | 4720 | — | — |
| 178 | 200 | 801 | 380 | 3670 | — | — |
| 316 | 183 | 619 | 337 | 2468 | — | — |

Figure 3:
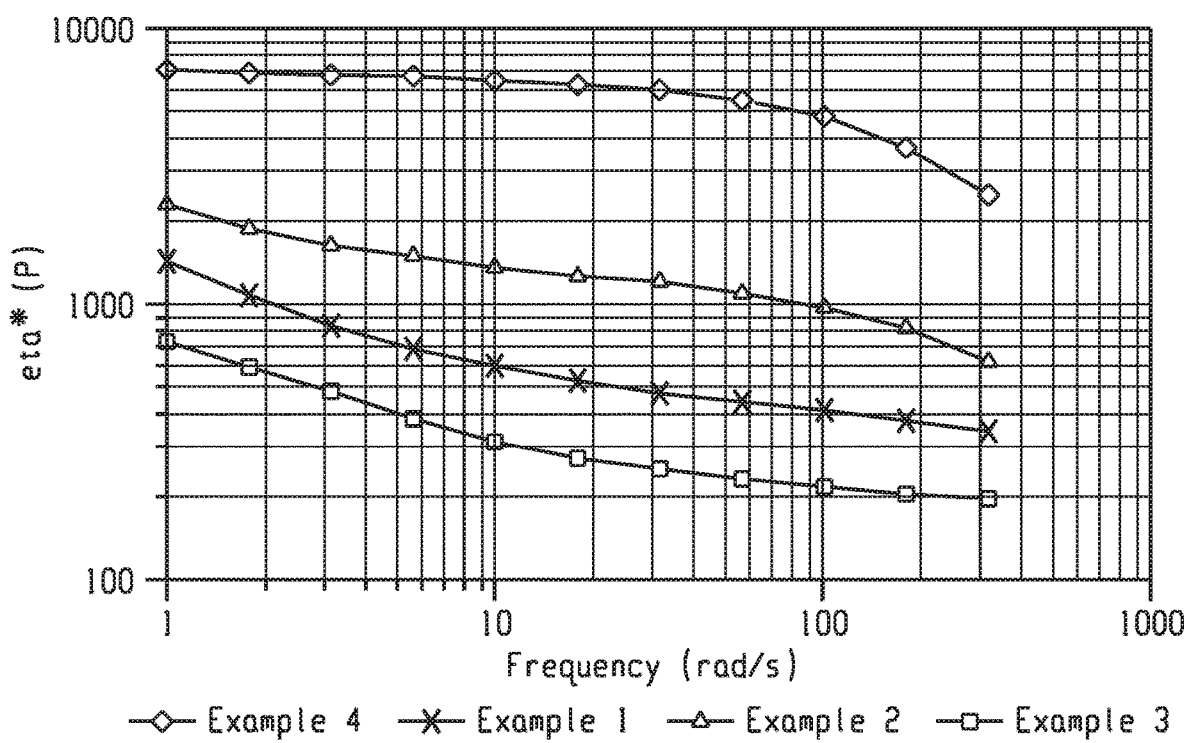
FIG. 3 is a graphical representation of data from the examples.

The cyclics concentration increased dramatically as 3-ClPA loading increased in the PEI polymer backbone. The cyclics [n=1] levels was found to increase from 0.1 wt % (95% 4-ClPA; comparative example 4) to 15-20 wt % (98% 3-ClPA; comparative example 5). The higher percentage of 3-ClPA generates increased amounts of 3,3'-ClPAMI which undergoes intramolecular cyclization with one mole of BPA salt to generate enhanced levels of cyclic species. The comparative examples were made without using a polymer additive. The PEIs of examples 1-3 and 6 were prepared using a polymer additive and using the 3-ClPA and 4-ClPA composition shown in Table 2. The polymers prepared were targeted for a weight average molecular weight of 37,000-55,000 atomic mass unit (amu) (polystyrene standards were used for calibration). Table 2 shows a summary of the molecular weight of the polymer (amu), polydispersity index (PDI), cyclic [n=1] concentration, glass transition temperature (Tg), and flow (as indicated by viscosity (or 210-275 ppm. The viscosity measurements of the polymer samples were performed using Parallel Plate Rheometry at 380° C. The frequency sweep comparison of the Examples 1-3 with comparative example 4 showed that the Examples 1-3 have lower viscosity than a control sample at lower frequency (FIG. 3). The examples 1-3 had a rheology ratio (flow) of 2.3-3.3, whereas comparative example 3 had a rheology ratio of 2. The polymers were also evaluated for shear thinning behavior at shear rates similar to injection molding rates. Examples 1-3 showed up to 10% better flow (improved shear thinning) at shear rates similar to injection molding.

The following aspects can be included within the scope of the invention.

Aspect 1: A method of making polyetherimide comprising: reacting a diamine having four bonds between the amine groups, a diamine having greater than or equal to five bonds between the amine groups, 4-halophthalic anhydride and 3-halophthalic anhydride at an imidization reaction temperature and pressure in the presence of a solvent and a polymer additive to produce a mixture comprising 3,3'-bis (halophthalimide)s, 3,4'-bis(halophthalimide)s, 4,4'-bis (halophthalimide)s, solvent and the polymer additive wherein the molar ratio of 3-halophthalic anhydride to 4-halophthalic anhydride is 98:02 to 50:50 and the molar ratio of the diamine having four bonds to the diamine having greater than or equal to five bonds between the amine groups is 98:02 to 02:98; reacting the mixture with an alkali metal salt of a dihydroxy aromatic compound to produce a polyetherimide having a cyclics content less than or equal to 5 weight percent, based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure.

Aspect 2: A method of making polyetherimide comprising: reacting an aromatic diamine having amine groups located on the aromatic ring in a meta relationship, an aromatic diamine having amine groups located on the aromatic ring in a para relationship, 4-halophthalic anhydride and 3-halophthalic anhydride at an imidization reaction temperature and pressure in the presence of a solvent and a polymer additive to produce a mixture comprising 3,3'-bis (halophthalimide), 3,4'-bis(halophthalimide), 4,4'-bis (halophthalimide), solvent and the polymer additive wherein the molar ratio of 3-halophthalic anhydride to 4-halophthalic anhydride is 98:02 to 50:50 and the molar ratio of the diamine having amine groups in a meta relationship to the diamine having amine groups in a para relationship is 98:02 to 02:98; reacting the mixture with alkali metal salt of a dihydroxy aromatic compound to produce a polyetherimide having a cyclics content less than or equal to 5 weight percent based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure.

Aspect 3: A method of making a polyetherimide comprising: reacting m-phenylenediamine, and one or more of p-phenylenediamine and 4,4'-diaminodiphenylamine, 4-halophthalic anhydride, and 3-halophthalic anhydride at an imidization reaction temperature and pressure in the presence of a solvent and a polymer additive to produce a mixture comprising: 3,3'-bis(halophthalimide) having formula (I)

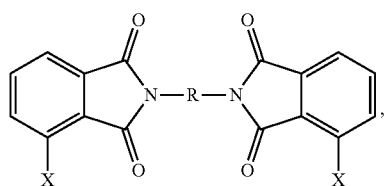

wherein R is m-phenylene; 3,3'-bis(halophthalimide) having formula (I)

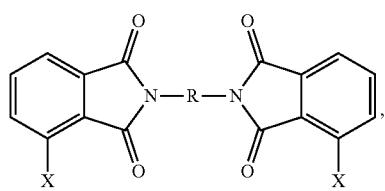

wherein R is p-phenylene, p-diphenylsulfone or a combination thereof; 3,4'-bis(halophthalimide) having formula (II)

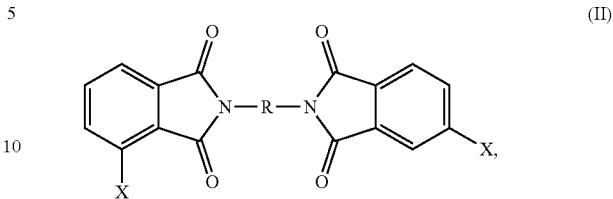

wherein R is m-phenylene; 3,4'-bis(halophthalimide) having formula (II)

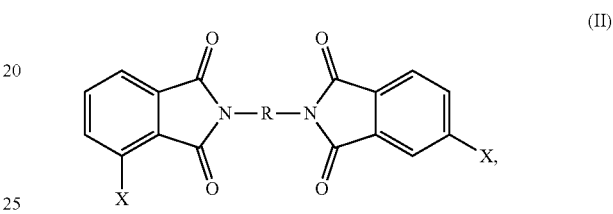

wherein R is p-phenylene, p-diphenylsulfone or a combination thereof; 4,4'-bis(halophthalimide) having formula (III)

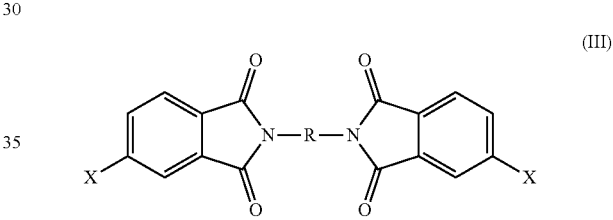

wherein R is m-phenylene; 4,4'-bis(halophthalimide) having formula (III)

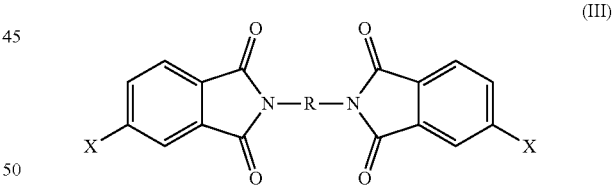

wherein R is p-phenylene, p-diphenylsulfone or a combination thereof, solvent, and polymer additive; and wherein the molar ratio of 3-halophthalic anhydride to 4-halophthalic anhydride is 98:02 to 50:50 and the molar ratio of the m-phenylenediamine to the p-phenylenediamine, 4,4'-diaminodiphenyl sulfone, or combination thereof is 98:02 to 02:98; reacting the mixture with an alkali metal salt of a dihydroxy aromatic compound to produce a polyetherimide having a cyclics content less than or equal to −5 weight percent, based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure.

Aspect 4: The method of Aspect 1, wherein the molar ratio of diamine having 4 bonds between amine groups relative to diamine having greater than or equal to 5 bonds between the amine groups is 98:2 to 60:40, or 95:5 to 75:25, or 90:10 to 80:20.

Aspect 5: The method of Aspect 1, wherein the molar ratio of diamine having 4 bonds between amine groups relative to diamine having greater than or equal to 5 bonds between the amine groups is 90:10 to 10:90, or 75:25 to 25:75, or 65:35 to 35:65.

Aspect 6: The method of Aspect 2, wherein the molar ratio of diamine having amine groups in a meta relationship relative to diamine having amine groups in a para relationship is 98:2 to 60:40, or 95:5 to 75:25, or 90:10 to 80:20.

Aspect 7: The method of Aspect 2, wherein the molar ratio of diamine having amine groups in a meta relationship relative to diamine having amine groups in a para relationship is 90:10 to 10:90, or 75:25 to 25:75, or 65:35 to 35:65.

Aspect 8: The method of Aspect 3, wherein the molar ratio of m-phenylenediamine relative to the one or more of p-phenylenediamine, 4,4'-diaminodiphenyl sulfone, or combination thereof is 98:2 to 60:40, or 95:5 to 75:25, or 90:10 to 80:20.

Aspect 9: The method of Aspect 3, wherein the molar ratio of m-phenylenediamine relative to the one or more of p-phenylenediamine, 4,4'-diaminodiphenyl sulfone, or combination thereof is 90:10 to 10:90, or 75:25 to 25:75, or 65:35 to 35:65.

Aspect 10: The method of any of the preceding Aspects, wherein the solvent comprises ortho-dichlorobenzene, dichlorotoluene, 1,2,4-trichlorobenzene, anisole, veratrole, diphenyl ether, diphenyl sulfone, sulfolane, dimethyl sulfone, dimethyl formamide, dimethyl acetamide, N-methylpyrrolidone, dimethyl sulfoxide, m-cresol, hexamethyl phosphoramide, dimethyl imidazole, or a combination thereof.

Aspect 11: The method of any of the preceding Aspects, wherein the polymer additive comprises a polyetherimide, a polyamideimide, a polyethersulfone, a polyaryl ether ketone, a liquid crystal polymer, a polyimide or a combination thereof.

Aspect 12: The method of any of the preceding Aspects, wherein the imidization reaction temperature is greater than or equal to 110° C., 150° C. to 275° C., or, 175° C. to 225° C., and the imidization reaction pressure is greater than 0 to 7 atmospheres, or, greater than 0 to 3.5 atmospheres, or, greater than 0 to 1.75 atmospheres.

Aspect 13: The method of any of the preceding Aspects, wherein the mixture has a solids content of 20 to 55 wt %, 30 to 45 wt %, or 40 to 45 wt %.

Aspect 14: The method of any of the preceding Aspects, wherein the polymer additive is present in an amount of 0.5 to 7.5 wt %, or, 2 to 7.5 wt %, or, 5 to 7.5 wt %, based on the weight of the polyetherimide produced.

Aspect 15: The method of any of the preceding Aspects, wherein the polyetherimide has a cyclics content of 0.1 to 5 wt %, 0.1 to 4 wt %, or 0.01 to 3 wt %.

Aspect 16: The method of any of the preceding Aspects, wherein the alkali metal salt of a dihydroxy aromatic compound is an alkali metal salt of bisphenol A.

Aspect 17: The method of any of the preceding Aspects, wherein the polyetherimide has a viscosity that is at least 25% lower than the viscosity of a polyetherimide produced using a molar ratio of 3-halophthalic anhydride to 4-halophthalic anhydride of 05:95, when viscosity is determined using Parallel Plate Rheometry at 380° C.

Aspect 18: The method of any of the preceding Aspects, wherein the polyetherimide has a viscosity that is at least 30% lower than the viscosity of a polyetherimide produced using a molar ratio of 3-halophthalic anhydride to 4-halophthalic anhydride of 05:95, when viscosity is determined using Parallel Plate Rheometry at 380° C.

Aspect 19: The method of any of the preceding Aspects, wherein the polyetherimide has a viscosity that is at least 40% lower than the viscosity of a polyetherimide produced using a molar ratio of 3-halophthalic anhydride to 4-halophthalic anhydride of 05:95, when viscosity is determined using Parallel Plate Rheometry at 380° C.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, of the formula —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g, benzyl), $C_{7-12}$ alkylarylene (e.g, toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituent(s).

All patents and references cited herein are incorporated by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making polyetherimide comprising:
    reacting a diamine having four bonds between the amine groups, a diamine having greater than or equal to five bonds between the amine groups, 4-halophthalic anhydride and 3-halophthalic anhydride at an imidization reaction temperature and pressure in the presence of a solvent and a polymer additive to produce a mixture comprising 3,3'-bis(halophthalimide)s, 3,4'-bis(halophthalimide)s, 4,4'-bis(halophthalimide)s, solvent and the polymer additive wherein the molar ratio of 3-halophthalic anhydride to 4-halophthalic anhydride is 98:02 to 50:50 and the molar ratio of the diamine having four bonds to the diamine having greater than or equal to five bonds between the amine groups is 98:02 to 02:98; and
    reacting the mixture with an alkali metal salt of a dihydroxy aromatic compound to produce a polyetherimide having a cyclics content less than or equal to 5 weight percent, based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure;
    wherein the polymer additive is present in an amount of 5 to 7.5 wt %, based on the weight of the polyetherimide produced.

2. The method of claim 1, wherein the diamine having four bonds between the amine groups comprises an aromatic diamine having amine groups located on the aromatic ring in a meta relationship and the diamine having greater than or equal to five bonds between the amine groups comprises an aromatic diamine having amine groups located on the aromatic ring in a para relationship.

3. The method of claim 1 wherein the diamine having four bonds between the amine groups comprises m-phenylenediamine, and the diamine having greater than or equal to five bonds between the amine groups comprises one or more of p-phenylenediamine and 4,4'-diaminodiphenyl sulfone.

4. The method of claim 1, wherein the molar ratio of diamine having 4 bonds between amine groups relative to diamine having greater than or equal to 5 bonds between the amine groups is 98:2 to 60:40.

5. The method of claim 1, wherein the molar ratio of diamine having 4 bonds between amine groups relative to diamine having greater than or equal to 5 bonds between the amine groups is 90:10 to 10:90.

6. The method of claim 2, wherein the molar ratio of diamine having amine groups in a meta relationship relative to diamine having amine groups in a para relationship is 98:2 to 60:40.

7. The method of claim 2, wherein the molar ratio of diamine having amine groups in a meta relationship relative to diamine having amine groups in a para relationship is 90:10 to 10:90.

8. The method of claim 3, wherein the molar ratio of m-phenylenediamine relative to the one or more of p-phenylenediamine and 4,4'-diaminodiphenyl sulfone is 98:2 to 60:40.

9. The method of claim 3, wherein the molar ratio of m-phenylenediamine relative to the one or more of p-phenylenediamine and 4,4'-diaminodiphenyl sulfone is 90:10 to 10:90.

10. The method of claim 1, wherein the solvent comprises ortho-dichlorobenzene, dichlorotoluene, 1,2,4-trichlorobenzene, anisole, veratrole, diphenyl ether, diphenyl sulfone, sulfolane, dimethyl sulfone, dimethyl formamide, dimethyl acetamide, N-methylpyrrolidone, dimethyl sulfoxide, m-cresol, hexamethyl phosphoramide, dimethyl imidazole, or a combination thereof.

11. The method of claim 1, wherein the polymer additive comprises a polyetherimide, a polyamideimide, a polyethersulfone, a polyaryl ether ketone, a liquid crystal polymer, a polyimide or a combination thereof.

12. The method of claim 1, wherein the imidization reaction temperature is greater than or equal to 110° C., and the imidization reaction pressure is greater than 0 to 7 atmospheres.

13. The method of claim 1, wherein the mixture has a solids content of 20 to 55 wt %.

14. The method of claim 1, wherein the polyetherimide has a cyclics content of 0.1 to 5 wt %.

15. The method of claim 1, wherein the alkali metal salt of a dihydroxy aromatic compound is an alkali metal salt of bisphenol A.

16. The method of claim 1, wherein the polyetherimide has a viscosity that is at least 25% lower than the viscosity of a polyetherimide produced using a molar ratio of 3-halophthalic anhydride to 4-halophthalic anhydride of 05:95, when viscosity is determined using Parallel Plate Rheometry at 380° C.

17. A method of making polyetherimide comprising:
reacting an aromatic diamine having amine groups located on the aromatic ring in a meta relationship, an aromatic diamine having amine groups located on the aromatic ring in a para relationship, 4-halophthalic anhydride and 3-halophthalic anhydride at an imidization reaction temperature and pressure in the presence of a solvent and a polymer additive to produce a mixture comprising 3,3'-bis(halophthalimide), 3,4'-bis(halophthalimide), 4,4'-bis(halophthalimide), solvent and the polymer additive wherein the molar ratio of 3-halophthalic anhydride to 4-halophthalic anhydride is 98:02 to 50:50 and the molar ratio of the diamine having amine groups in a meta relationship to the diamine having amine groups in a para relationship is 98:02 to 02:98; and
reacting the mixture with alkali metal salt of a dihydroxy aromatic compound to produce a polyetherimide having a cyclics content less than or equal to 5 weight percent based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure and wherein the polymer additive comprises a polyetherimide, a polyamideimide, a polyethersulfone, a polyaryl ether ketone, a liquid crystal polymer, a polyimide or a combination thereof;
wherein the polymer additive is present in an amount of to 7.5 wt %, based on the weight of the polyetherimide produced.

18. A method of making a polyetherimide comprising:
reacting 4-halophthalic anhydride and 3-halophthalic anhydride with m-phenylenediamine, and one or more of p-phenylenediamine and 4,4'-diaminodiphenyl sulfone, at an imidization reaction temperature and pressure in the presence of a solvent and a polymer additive to produce a mixture comprising:
3,3'-bis(halophthalimide) having formula (I)

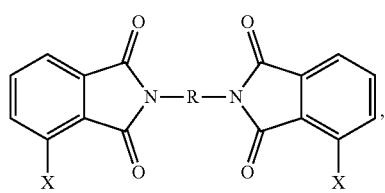

wherein R is m-phenylene;
3,3'-bis(halophthalimide) having formula (I)

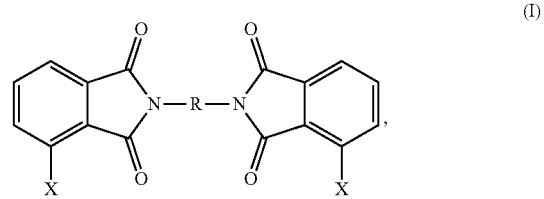

wherein R is p-phenylene, p-diphenylsulfone or a combination thereof;
3,4'-bis(halophthalimide) having formula (II)

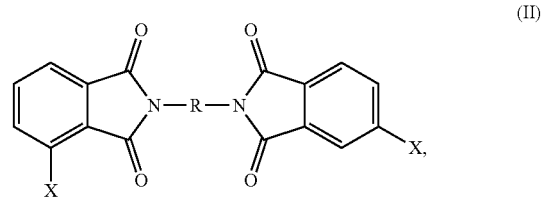

wherein R is m-phenylene;
3,4'-bis(halophthalimide) having formula (II)

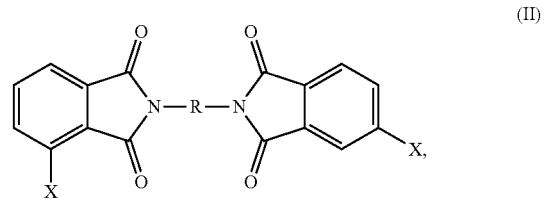

wherein R is p-phenylene, p-diphenylsulfone or a combination thereof;
4,4'-bis(halophthalimide) having formula (III)

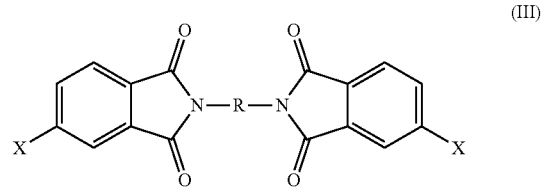

wherein R is m-phenylene;
4,4'-bis(halophthalimide) having formula (III)

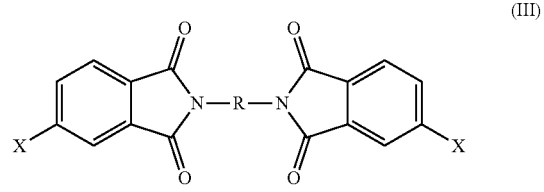

wherein R is p-phenylene, p-diphenylsulfone or a combination thereof, solvent, and polymer additive; and wherein the molar ratio of 3-halophthalic anhydride to 4-halophthalic anhydride is 98:02 to 50:50 and the molar ratio of the m-phenylenediamine to the one or more of p-phenylenediamine and 4,4'-diaminodiphenyl sulfone is 98:02 to 02:98; and reacting the mixture with an alkali metal salt of a dihydroxy aromatic compound to produce a polyetherimide having a cyclics content less than or equal to 5 weight percent, based on the total weight of the polyetherimide, a glass transition temperature greater than or equal to 216° C., and a weight average molecular weight greater than or equal to 25,000 Daltons; wherein the polymer additive dissolves in the solvent at the imidization reaction temperature and pressure and wherein the polymer additive comprises a polyetherimide, a polyamideimide, a polyethersulfone, a polyaryl ether ketone, a liquid crystal polymer, a polyimide or a combination thereof;

wherein the polymer additive is present in an amount of to 7.5 wt %, based on the weight of the polyetherimide produced.

* * * * *